United States Patent [19]

Tonkiss

[11] Patent Number: 4,996,868
[45] Date of Patent: Mar. 5, 1991

[54] CALIBRATION DEVICE FOR BANDING TOOLS

[75] Inventor: David W. Tonkiss, Glendale, Calif.

[73] Assignee: Joslyn Corporation, Chicago, Ill.

[21] Appl. No.: 373,031

[22] Filed: Jun. 28, 1989

[51] Int. Cl.[5] ............................ G01L 25/00; G01L 5/06
[52] U.S. Cl. ..................................... 73/1 B; 73/862.42
[58] Field of Search ............ 73/1 R, 1 B, 1 C, 862.39, 73/862.42, 862.44, 862.53, 862.62, 828, 830

[56] References Cited

U.S. PATENT DOCUMENTS

| | | | |
|---|---|---|---|
| 2,002,977 | 5/1935 | Carr | 73/862.39 |
| 2,363,347 | 11/1944 | Mars | 73/1 B |
| 2,390,802 | 12/1945 | Mars | 73/862.42 X |
| 2,782,635 | 2/1957 | Knight | 73/828 |
| 3,115,029 | 12/1963 | Better | 73/1 C |
| 3,370,458 | 2/1968 | Dillon | 73/862.62 X |

Primary Examiner—Charles A. Ruehl
Attorney, Agent, or Firm—Mason, Kolehmainen, Rathburn & Wyss

[57] ABSTRACT

A calibration device measures the maximum pull force developed by a banding tool while tightening a metal band around a tubular sleeve, such as a termination sleeve on an electrical connector housing. The calibration device includes a strain gauge assembly carried by a frame. One portion of the frame includes a releasable jaw assembly for securely capturing the band to allow the pull force of the tool to be measured. Disposed adjacent the releasable jaw assembly is a foot portion of the frame having a slot for receiving a removable nosepiece. The removable nosepiece is formed to the contour of the nosepiece of a particular banding tool. Since the nosepiece is removable, various nosepieces having contours for various banding tools can be utilized. The calibration device also includes a force release assembly for gradually releasing the force on the force sensing element to avoid damage thereto. The force release assembly includes a lever operated cam and a cam follower which allows the force on the force sensing element to be gradually released by rotating the lever.

25 Claims, 7 Drawing Sheets

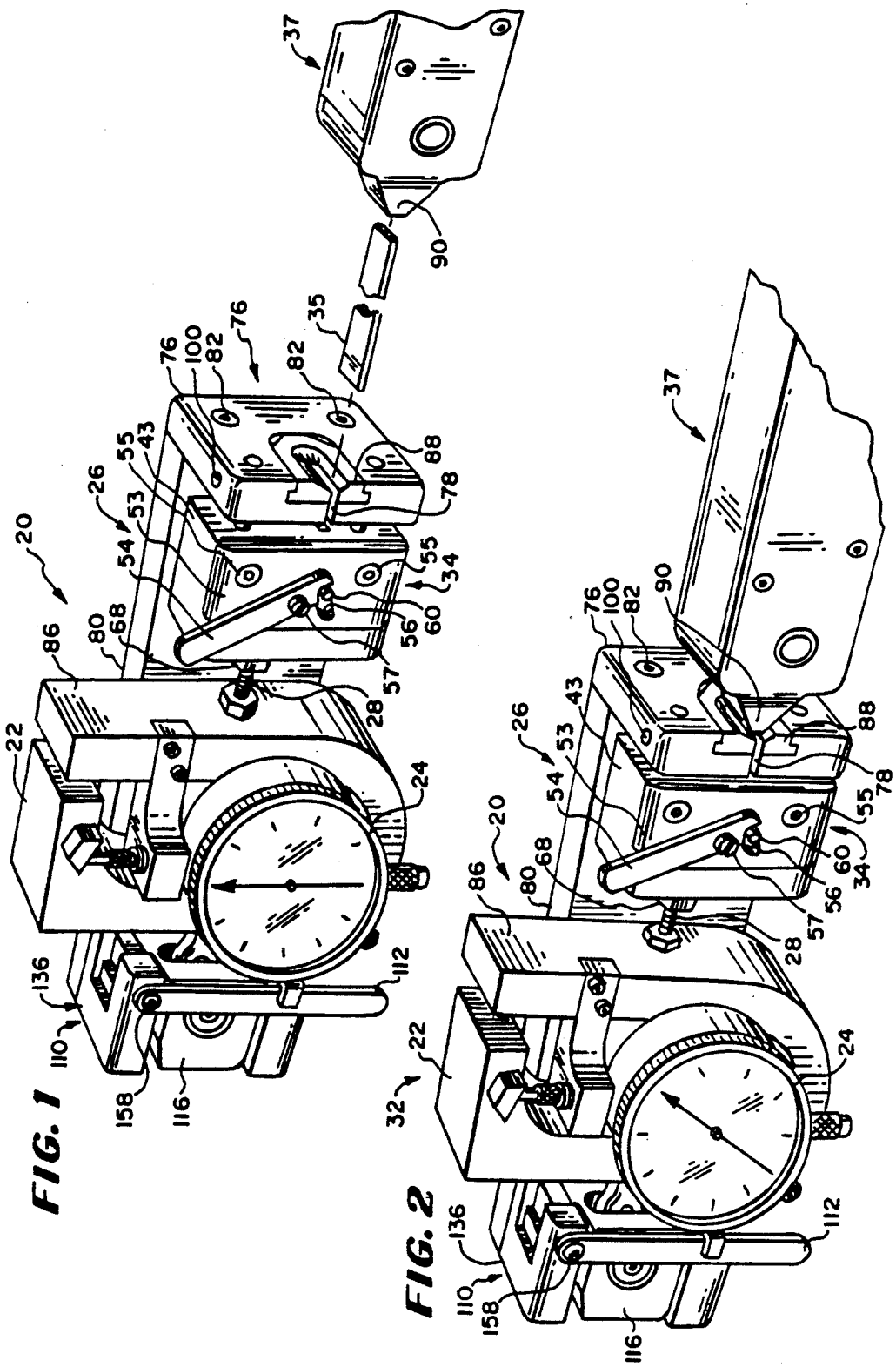

CALIBRATION DEVICE FOR BANDING TOOLS

BACKGROUND OF THE INVENTION

1. Technical Field

The present invention relates to a calibration device for measuring the maximum pull force developed by a banding tool while tightening a metal band about a tubular sleeve; which includes a force release assembly for gradually releasing the force to prevent damage to the force sensing element.

2. Description of the Prior Art

Various tools are known in the art for terminating a metal band about a tubular sleeve, to secure, for example, an electrical cable shield, such as a woven copper braid, to an electrical connector housing. In order to prevent damage to the tubular sleeve on the connector housing, often made of cast aluminum, various banding tools are known having a preset pull force to avoid damage to the tubular sleeve on the electrical connector housing. For example, both a power operated tool and a manually operated tool are known which have assemblies which prevent the tools from applying more than a predetermined amount of pull force. These tools are assigned to the same assignee of the present invention and are disclosed in copending applications Ser. No. 07/277,325, filed on Nov. 29, 1988, and Ser. No. 07/370,597, filed on Jun. 23, 1989.

A calibration device is generally used to measure the maximum pull force generated by both the manually operated tool and the power operated tool. Known calibration devices for such tools often include a strain gauge assembly and a pair of releasable jaws for holding a portion of a metal band. In order to calibrate the tool, one end of a metal band is placed into the releasable jaws on the calibration device. The other end of the metal band is placed into the tool. The tool is then operated and the maximum pull force is read off a dial on the calibration device. In some power operated tools, the driving motor, whether electrical or pneumatic, is reversible. With such tools the driving motor may be operated in reverse to gradually relieve the force on the force sensing element within the strain gauge assembly. In other power operated tools and known manually operated tools, there are no means to gradually reduce the force on the force sensing element after the maximum pull force has been determined. With such tools, the band is cut between the tool and the calibration device. However, such cutting results in a sudden release of force which can damage the force sensing element. Replacement of damaged force sensing elements can be rather costly.

Another problem with known calibration devices is that it is necessary for the banding tool to be stationary with respect to the calibration device during calibration. This requires that the nosepiece of the tool be held in intimate contact with the calibration device. In known calibration devices, the contour of the nosepiece of the tool is molded into the frame of the calibration device. However, since different banding tools have different nosepiece configurations, such calibration devices can only be used for banding tools with the same nose-piece configuration.

SUMMARY OF THE INVENTION

It is an object of the present invention to provide a calibration device for banding tools which solves the problems associated with the prior art.

It is another object of the present invention to provide a calibration device for measuring the maximum pull force of a banding tool which allows the force on the force sensing element to be gradually released.

It is another object of the present invention to provide a calibration device which can accommodate banding tools having various nosepiece configurations.

Briefly, the present invention relates to a calibration device for measuring the maximum pull force of a banding tool developed while tightening a metal band around a tubular sleeve, such as a termination sleeve on an electrical connector housing. The tool includes a force sensing element, carried by a frame. One side of the force sensing element is coupled to a releasable jaw assembly for securely capturing one end of the band. Disposed adjacent to the jaw assembly is a foot portion of the frame which includes a removable nosepiece. The removable nose-piece is formed to the contour of a nosepiece of a particular banding tool. Since the nosepiece is removable, various nosepieces having contours for various banding tools can be utilized. The other side of the force sensing element is coupled to an assembly for gradually releasing the force on the force sensing element to avoid damage thereto. The force release assembly includes a lever operated cam and a cam follower which allows the force on the force sensing element to be gradually released by rotating the lever.

DESCRIPTION OF THE DRAWING

These and other objects of the present invention can be readily understood by reference to the following description and accompanying drawing, wherein:

FIG. 1 is a perspective view of the calibration device in accordance with the present invention, shown at rest and also illustrating a portion of a metallic band and a portion of the nosepiece of a banding tool;

FIG. 2 is similar to FIG. 1 illustrating calibration device during a calibration;

DETAILED DESCRIPTION

Figure 3:
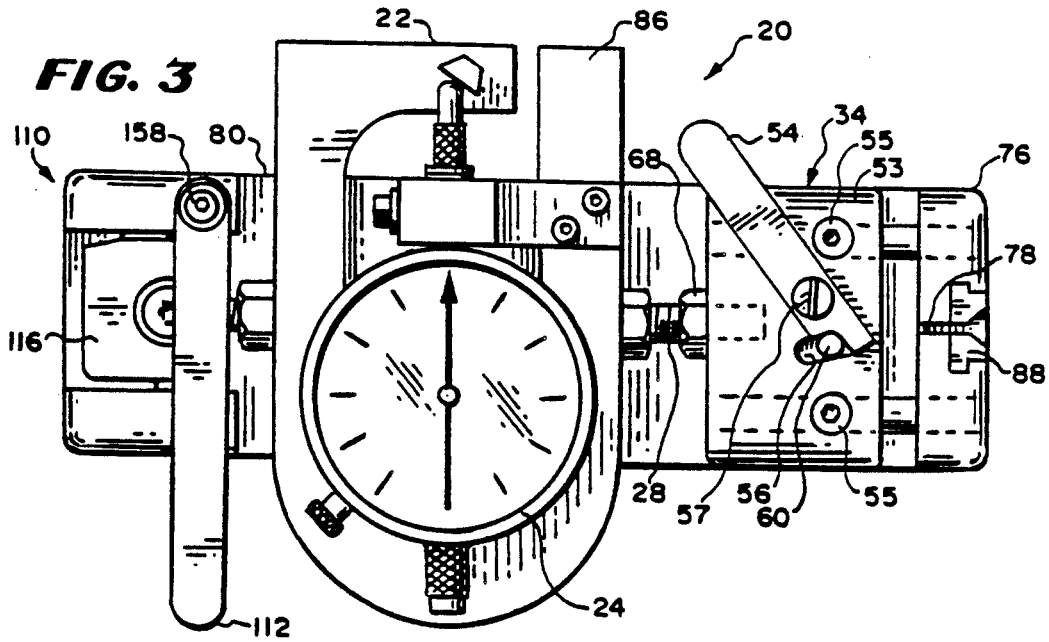
FIG. 3 is a front elevational view of the calibration device of FIG. 1 shown at rest.

Referring to the drawings and particularly to FIG. 1, the calibration device in accordance with the present invention is generally identified by the reference numeral 20. The calibration device 20 includes a force sensing assembly, such as a horseshoe type linear strain gauge assembly 22, having a dial indicator 24, carried by a frame assembly or fixture 26. The strain gauge assembly 22 may be a horseshoe type linear strain gauge assembly. This type of strain gauge assembly 22 operates on the principle of indicating forces applied between the legs of the horseshoe. Such a horseshoe type linear strain gauge assembly is commercially available and does not form a portion of the present invention. For example, suitable strain gauge assembly for use with the present invention may be a mechanical force gauge assembly as manufactured by Dillon/Quality Plus Strain Gauge. However, it should be understood that other types of strain gauge assemblies may also be used.

Figure 4:
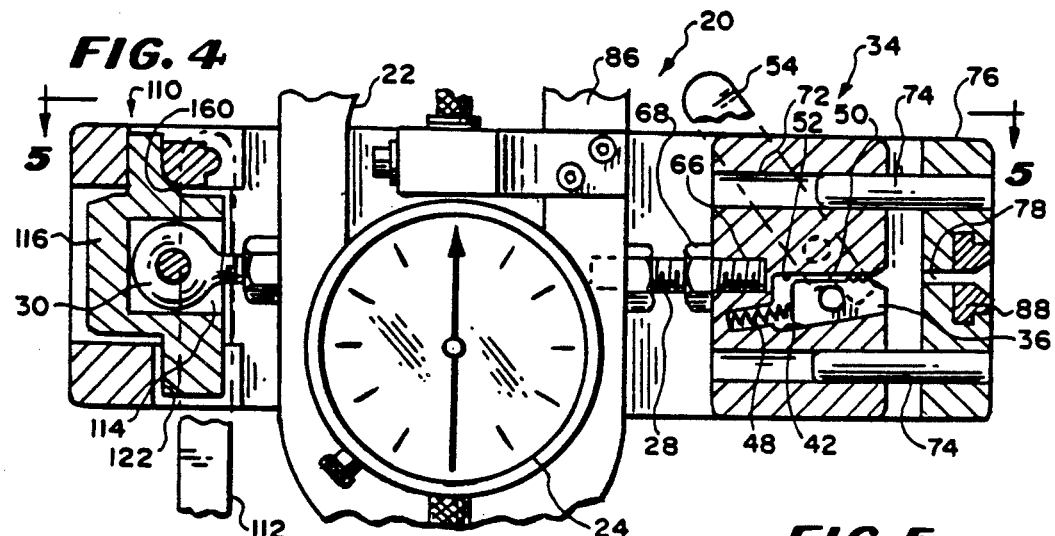
FIG. 4 is a partial sectional view of the calibration device in accordance with the present invention.

The strain gauge assembly 22 is mounted to the frame assembly 26 by way of a front stud mount 28 and a rear rod end bearing mount 30. The front stud mount 28 securely attaches one leg of the horseshoe portion 32 of the strain gauge assembly 22 to a releasable jaw assembly 34. The releasable jaw assembly securely captures one end of a band 35 to allow the maximum pull force of a banding tool 37 to be measured. The releasable jaw assembly 34 includes a gripper 36 having a plurality of teeth 38 on its upper surface 40. The gripper 36 is disposed in a cavity 42 formed in a generally rectangular block portion 43 of the releasable jaw assembly 34. The bottom surface 44 of the cavity 42 is ramped with respect to the longitudinal axis 45 of the calibration device 20 and generally conforms to the bottom surface 47 of the gripper 36. This allows the gripper device 36 to move at an angle relative to the longitudinal axis 45. A bore 46 is provided in an adjacent sidewall 49 of the cavity 42 for receiving a spring 48. The spring 48 biases the gripper device 36 upwardly and to the right (FIG. 4) in the normal position to reduce the gap 50 between the gripper teeth 38 and the upper surface 52 of the cavity 42.

Figure 12:
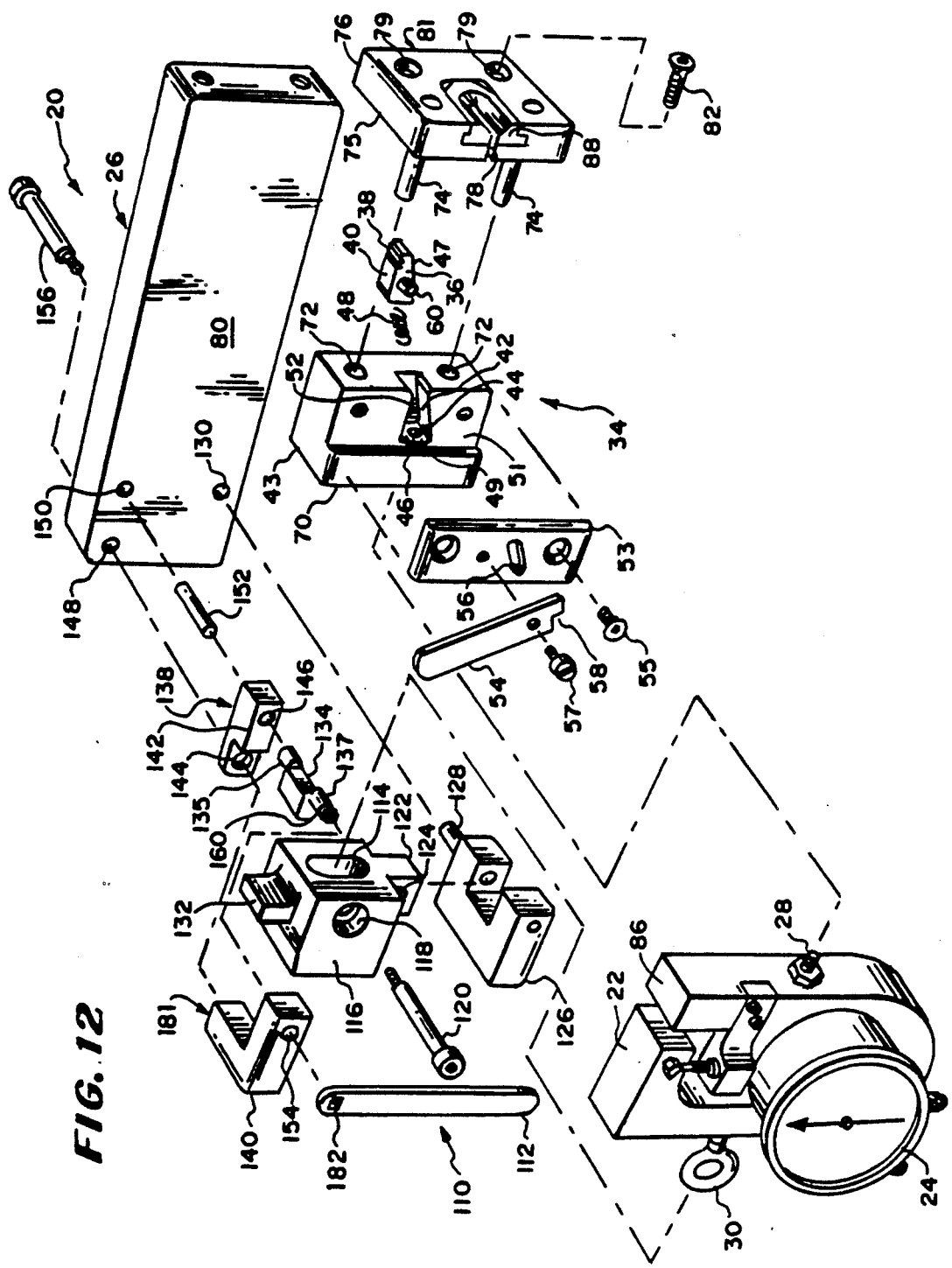
FIG. 12 is an exploded perspective view of the calibration device in accordance with the present invention.

The upper surface 52 of the cavity 42 forms a guide for the band 35. A front surface 51 of the block portion 43 of the releasable jaw assembly 34 is formed as a stepped surface as best shown in FIG. 12. A cover 53 is secured to the front surface 51 with a plurality of fasteners 55 to close a portion of the cavity 42.

When an end of a band. 35 is received in the releasable jaw assembly 34, the gripper device 36 is moved downwardly and to the left against the biasing force of the spring 48 to allow the band 35 to be inserted between the gripper teeth 38 and the upper surface 52 of the cavity 42. The teeth 38 on the gripper device 36 and the biasing spring 48 prevent the band 35 from being pulled out during measurement of the pull force.

Figure 5:
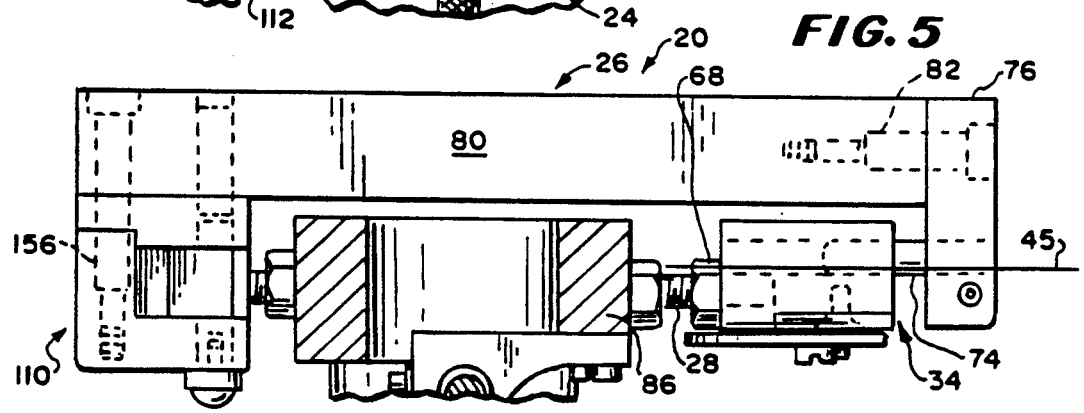
FIG. 5 is a partial sectional view along lines 5—5 of FIG. 4.
Figure 6:
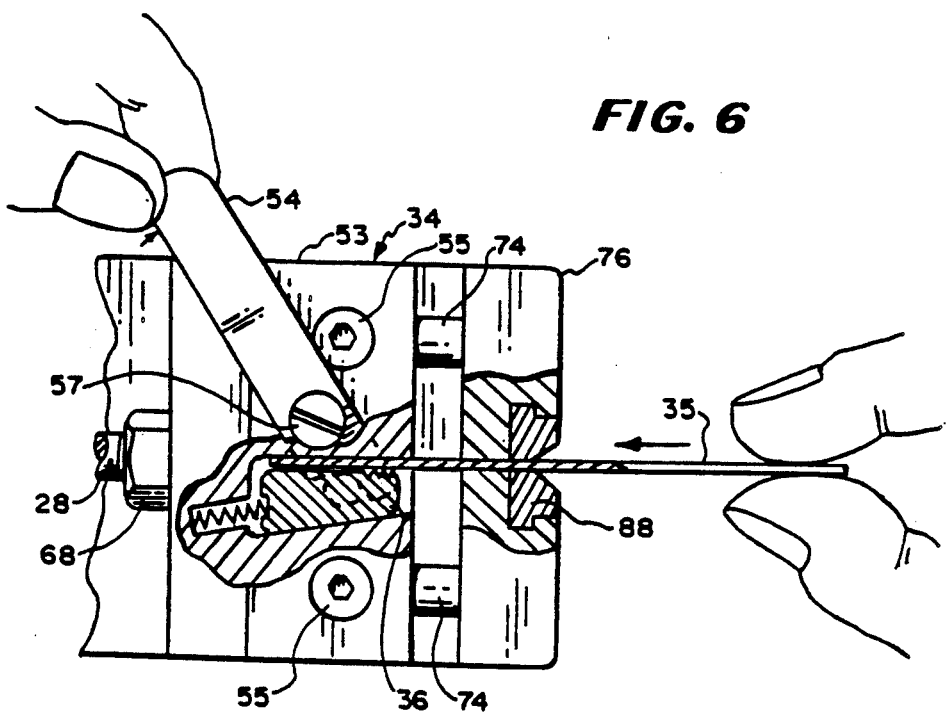
FIG. 6 is a partial sectional view of the front portion of the calibration device illustrating a band being inserted into the calibration device.
Figure 7:
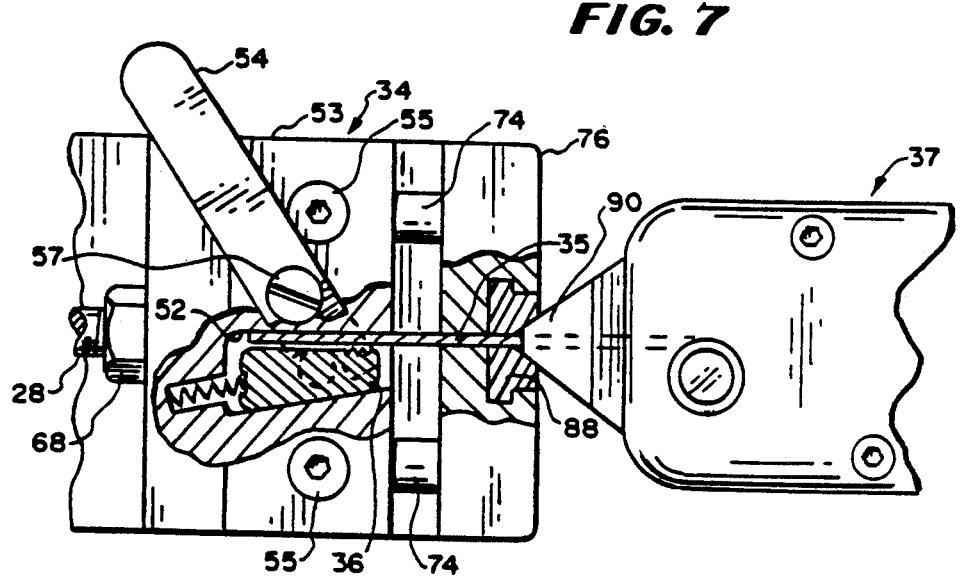
FIG. 7 is similar to FIG. 6 illustrating the band being captured within the releasable jaw assembly.

In order to release the band 35 from the jaw assembly 34, a lever 54 is provided. This lever 54 is pivotally mounted to the cover 53 about a pivot point 56 with an appropriate fastener 57. The bottom of the lever 54 is provided with a notch 58 which cooperates with a pin 60 rigidly attached to the gripper device 36. The pin 60 extends outwardly from the cover 53 through a slot 56. Under the influence of the biasing spring 48, the lever 54 is normally in the position shown in FIG. 5. As the lever 54 is rotated in a clockwise direction, the gripper device 36 is moved downwardly and to the left by virtue of the notch 58 being in contact with the pin 60. The movement of the gripper device 36 within the cavity 42 is limited by the pin 60 engaging ends of the slot 56.

The strain gauge assembly 22 is connected to the releasable jaw assembly 34 by way of the front stud mount 28. More specifically, the block 43 of the releasable jaw assembly 34 is provided with a threaded bore 66 for receiving the front stud mount 28 provided on the strain gauge assembly 22. A nut 68 is used to tighten the front stud mount 28 to the side surface 70 of the block 43. The block 43 of the releasable jaw assembly 34 is also provided with two longitudinal bores 72. These bores 72 are for receiving pins 74, rigidly attached to a foot portion 76 of the frame assembly 26.

The foot portion 76 is formed from a generally square block having two bores 79 adjacent one side 81. The foot portion 76 of the frame assembly 26 is secured to a rectangular rear frame member 80 by way of one or more fasteners 82 received through the bores 79. The pins 74 extend outwardly from the side surface 75 of the foot portion 76 and are received in bores 72 in the releasable jaw assembly 34. These pins 74 may extend the entire width of the foot portion 76 and are generally parallel to the transverse axis of the foot portion 76. Once the pins 74 are received in the bores 72 an open ended slot 78 formed in the foot portion 76 will be aligned with the gap 50 in the releasable jaw assembly 34 to form a guide track for the band 35.

The releasable jaw assembly 34 is spaced away from the foot portion 76 to define a gap 84. The gap 84 is a working gap necessary for proper operation of the strain gauge assembly 22. More specifically, movement of the releasable jaw assembly 34 toward the foot portion 76 during a measurement operation is translated to one leg 86 of the horseshoe type linear strain gauge assembly 22 due to the connection of front stud mount 28 to the releasable jaw assembly 34.

An important feature of the invention relates to the interchangeable nosepiece 88. In order to accurately measure the maximum pull force on a band 35 developed by a tool 37, it is necessary that the nosepiece 90 of the banding tool 37 be secured with respect to the removable nosepiece 88 in such a way that the band 35 is aligned with the slot 78 in the foot portion 76 of the frame assembly 26. As shown and illustrated throughout, the removable nosepiece 88 is adapted to be used with a generally triangular cross-sectional nosepiece 90. However, it should be understood that various removable nosepieces 88 can be utilized to accommodate various tools having different shaped nosepieces.

Figure 11:
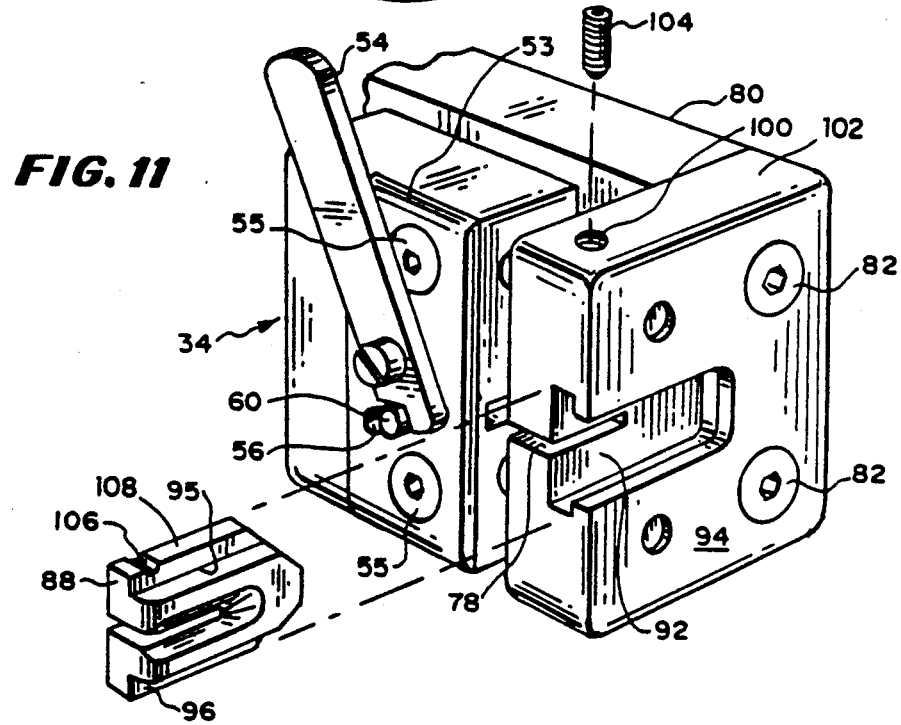
FIG. 11 is a partial perspective view of a portion of the calibration device in accordance with the present invention illustrating a foot portion of the frame and the interchangeable nosepiece.

As best shown in FIG. 11, the interchangeable nosepiece 88 is received in a generally rectangular stepped slot 92 formed in a front surface 94 of the foot portion 76. The top and bottom surfaces 95 and 96, respectively, of the removable nosepiece 88 are formed with stepped surfaces, adapted to be received in the open ended stepped slot 92.

In order to secure the interchangeable nosepiece 88 to the foot portion 76 of the frame assembly 26, a bore 100 is provided generally parallel to the front surface 94. This bore 100 extends from a top edge 102 of the foot portion 76 to the stepped slot 92. The bore 100 is threaded to receive a threaded set screw 104. The set screw 104 is adapted to cooperate with a notch 106 formed along a one edge 108 in the removable nosepiece 88. Once the set screw 104 is received in the notch 106, the interchangeable nosepiece 88 will be secured within the slot 92.

Another important feature of the present invention relates to force release assembly 110 for gradually releasing the force on the strain gauge assembly 22. The force release assembly 110 allows the force to be gradually reduced by allowing the strain gauge assembly 22 to be moved along an axis parallel to the longitudinal axis of the rear frame member 80.

The force release assembly 110 is mechanically coupled to the rear rod end bearing mount 30 of the strain gauge assembly 22. Once the maximum pull force has been measured, the force release assembly 110 allows the force on the force sensing element strain gauge assembly 22 to be gradually released. This avoids a sudden release of the force on the force sensing element which can cause damage.

The force release assembly 110 includes a cam operated mount, controlled by a force release lever 112. More particularly, the rear rod end bearing mount 30 is captured in a slot 114 formed in a holding block 116. A bore 118 is disposed in the holding block 116 to allow the rear rod end bearing mount 30 to be captured within the holding block 116 by a suitable fastener 120, such as a shoulder screw.

The holding block 116 is provided with an extending flange portion 122 having a bore 124. The extending flange portion 122 is received in a C-shaped frame member 126. A pin 128 which extends outwardly and generally perpendicularly from one leg of the C-shaped frame member is received in a bore 130 in the rear frame member 80. The pin 128 also extends through the bore 124 in the flange portion 122 to pivotally connect the holding block 116 with respect to the C-shaped frame member 126.

A cam follower 132 is disposed opposite the flange 122 on the holding block 116. The cam follower 132 cooperates with a pivotally mounted cam 134 which allows the holding block 116 to pivot to allow the strain gauge assembly 22 to move along the longitudinal axis of the rear frame member 80 toward the foot portion 76 of the frame to allow the force on the force sensing element in the strain gauge assembly to be released.

The cam follower 132 is received in a C-shaped frame subassembly 136 formed from frame members 138 and 140. The member 138 is formed with stepped surface 142 and is provided with two spaced apart bores 144 and 146. The bore 144 is threaded while the bore 146 is not. These bores 144 and 146 are aligned with bores 148 and 150 on the rear frame member 80. A pin 152 is received partially into the bore 150 in the rear frame member 80 and the bore 146 in the frame member 138 to couple the frame member 138 to the frame member 80. The bore 146 also serves as a pivot point for the pivotal cam 134. More specifically, one end 135 of the cam 134 is formed as a pin and is received in the bore 146 in the stepped frame member 138. The other end 137 of the cam 134 is also formed as a pin and is received in the bore 124 in the flange portion 116 of the holding block 116.

The member 140 is an L-shaped frame member and is disposed adjacent the stepped frame member 138 to form the C-shaped frame subassembly 136. A bore 181, provided in one leg of the L-shaped frame member 140, is aligned with the bore 148 in the rear frame member 80. A fastener 156, such as a shoulder screw, is received in the bores 148 and 181 to secure the L-shaped frame member 140 to the stepped frame member 138 and, in turn, to the rear frame member 80.

The end 137 of the cam 134 is formed with a square head and received in a square aperture 182 in the force release lever 112. A suitable fastener 158 may be used to secure the lever 112 to the cam 134.

The cam 134 is formed with a cam surface or cam lobe 160. Once assembled, the cam surface 160 is disposed adjacent the cam follower 132 formed on the holding block 116. The height of the cam lobe 160 is such to allow the full force on the force sensing element in the strain gauge assembly 22 to be released gradually upon rotation of the force release lever 112. The shape of the cam surface 160 is formed to allow the holding block 116 to pivot gradually to avoid any sudden release of force on the sensing element in strain gauge assembly 22 to prevent damage to it.

Figure 8:
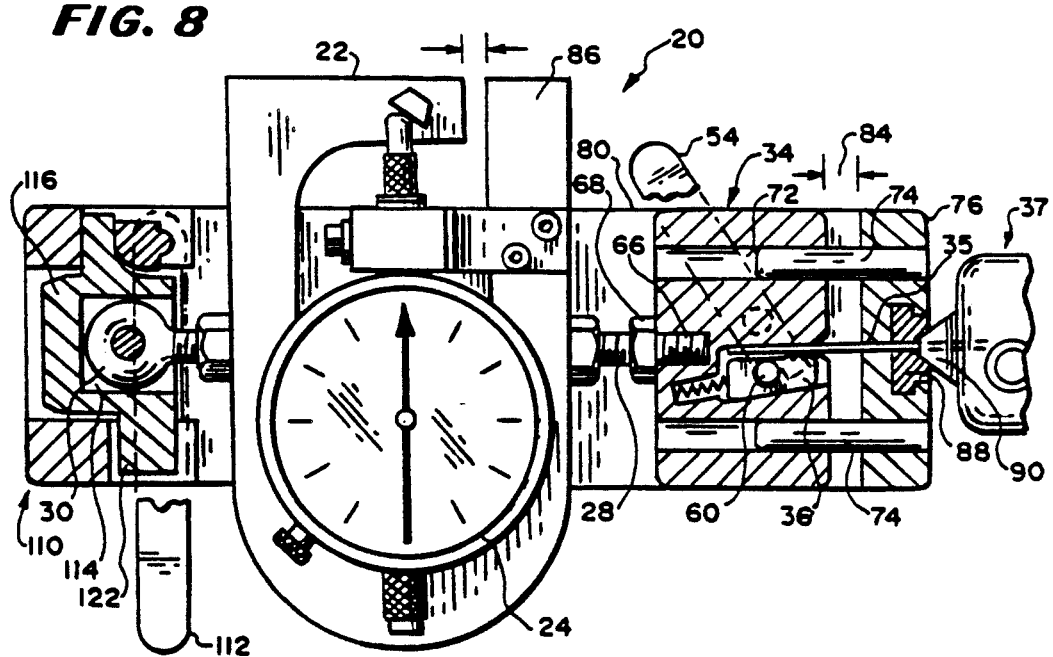
FIG. 8 is a partial sectional view of the calibration device in accordance with the present invention, shown at rest.
Figure 9:
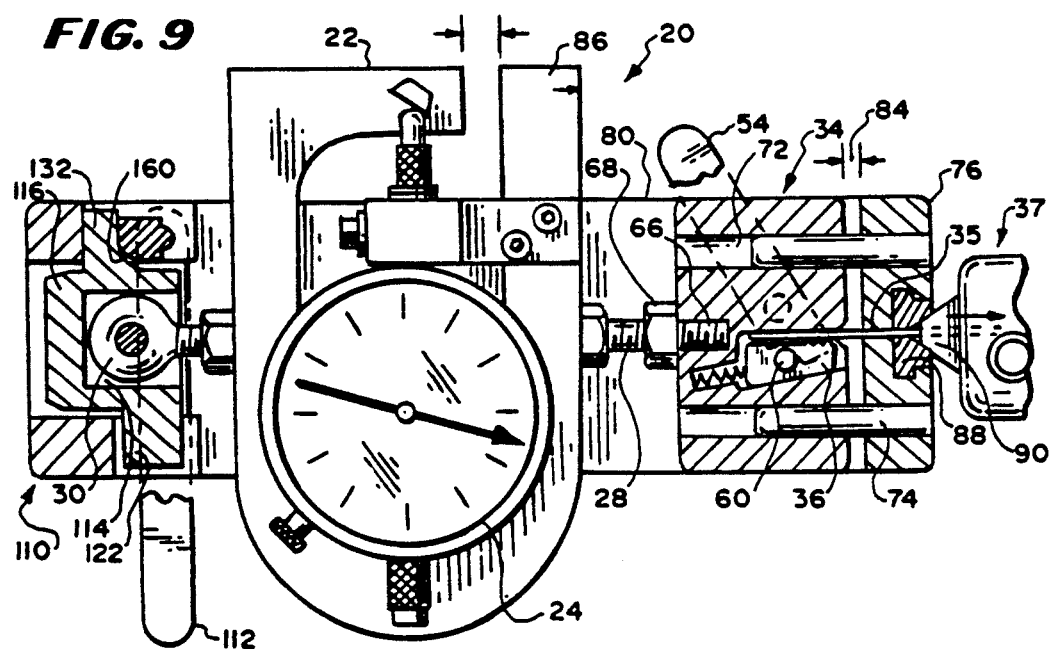
FIG. 9 is similar to FIG. 8 and illustrates the calibration device during calibration.
Figure 10:
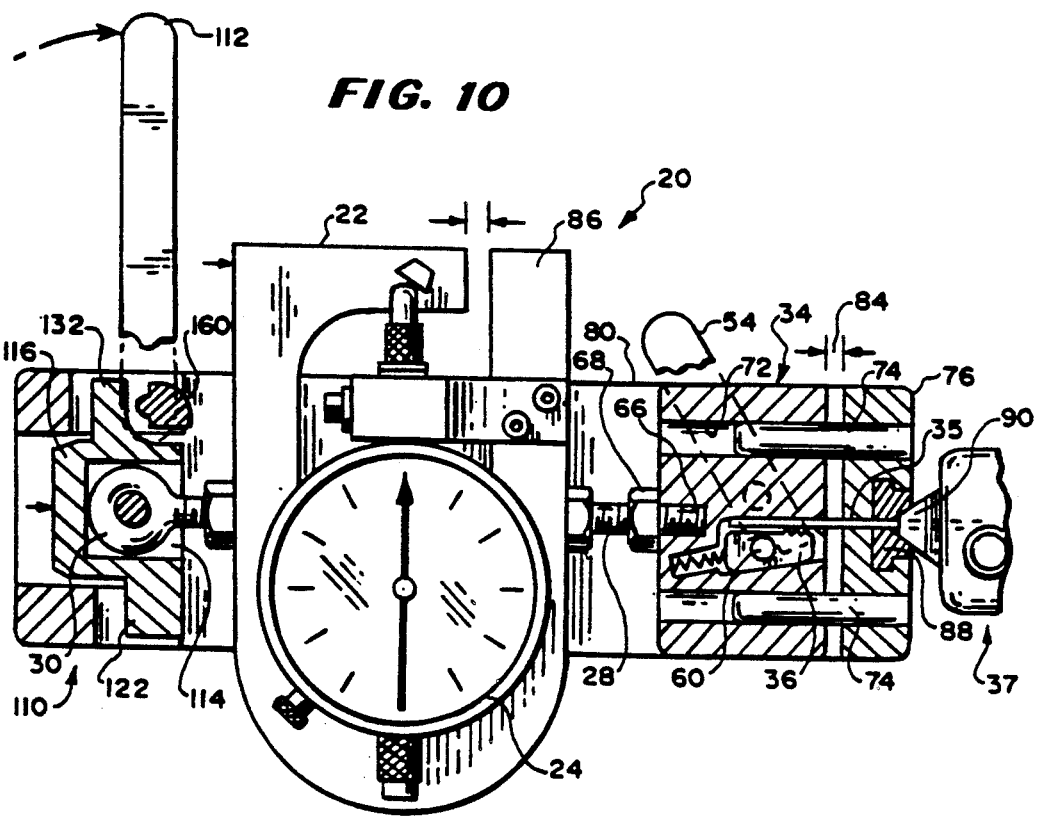
FIG. 10 is also similar to FIG. 8 and illustrates the position of the components after the force has been released by the force release assembly.

As best shown in FIGS. 8, 9 and 10, when the force release lever 112 is in its downward or normal position, the cam surface 160 forms a bearing surface for the cam follower 132. As the lever 112 is rotated in a clockwise direction to its release position (shown in FIG. 10), the cam lobe 160 is displaced away from the cam follower 132 to allow the holding block 116 to pivot in a clockwise direction (FIG. 10) about the pin 128 to allow the strain gauge assembly 22 to move toward the foot portion 76 to release the force on the calibration device 20 after a measurement.

Figure 13:
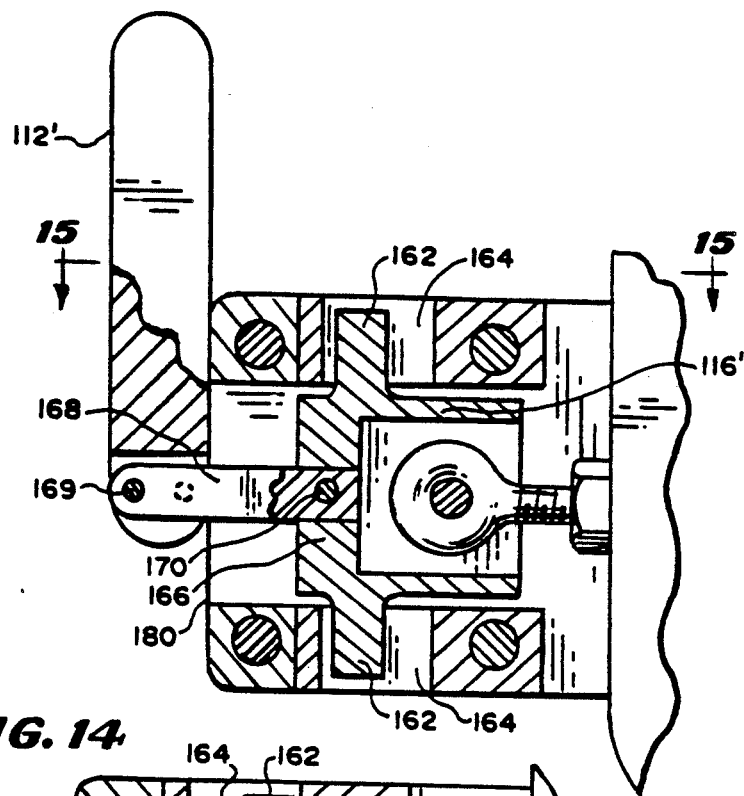
FIG. 13 is a partial sectional view of an alternate embodiment of the force release assembly in accordance with the present invention.
Figure 14:
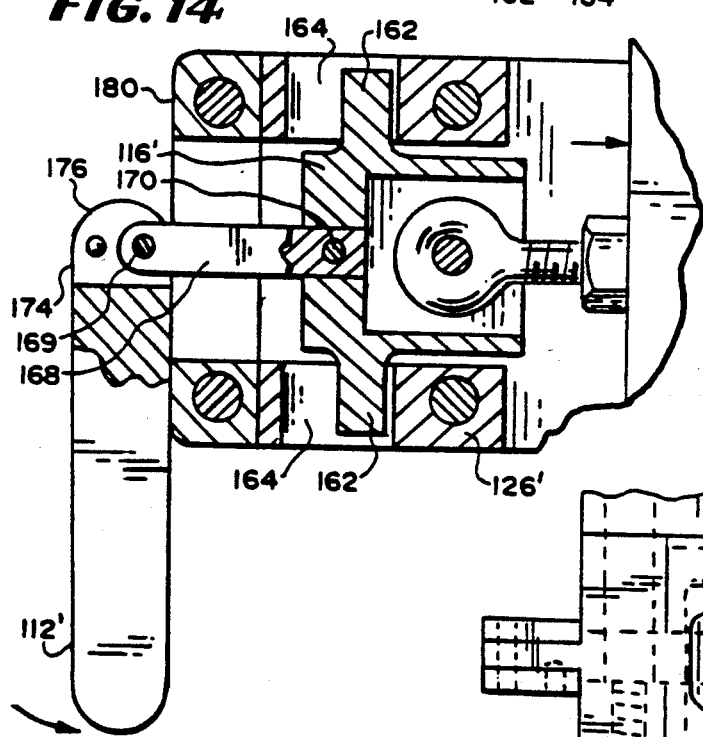
FIG. 14 is similar to FIG. 13 and illustrates the position of the force release assembly after the force has been released.
Figure 15:
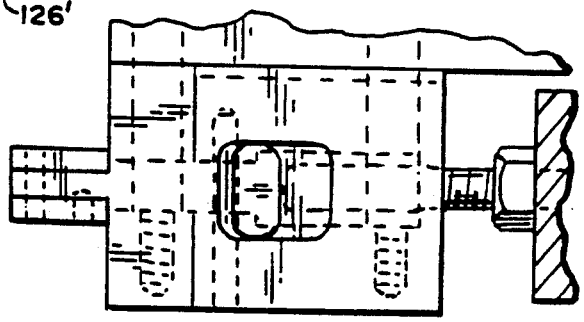
FIG. 15 is a partial sectional view of the alternate embodiment of the force release assembly taken along line 15—15 of FIG. 13.

An alternate embodiment of the force release assembly 110 is illustrated in FIGS. 13, 14 and 15. For simplicity, similar components will be identified with like reference numerals with primes. In this embodiment, the holding block 116' is formed with two extending ears 162. These ears 162 are received in slots 164 formed in C-shaped frame members 126'. The C-shaped frame members 126' are rigidly secured to the rear frame member 80 as heretofore described. A rear portion 166 of the holding block 116' is rigidly secured to a control lever 168 by a fastener 170. The control lever 168 extends in a direction parallel to the longitudinal axis of the rear frame member 80 and extends outwardly therefrom. The control lever 168 is pivotally connected off center to the force release lever 112' with a pin 169. Disposed adjacent the pin 169 is a cam surface 176 formed on the end of the force release lever 112'. The cam surface 176 cooperates with one edge 180 of the frame assembly 26 to allow the holding block 116' to move along the longitudinal axis of the rear frame member 80. More specifically, as shown in FIG. 13 with the force release lever 112' in the normal position, the pin 169 used to pivotally connect the control lever 168 to the force release lever 112' is disposed at its maximum distance away from an edge 180 of the rear frame member 80. As shown in FIG. 14, as the force control lever 112' is rotated in a counterclockwise direction to the release position, the off-center pin 169 is disposed at its minimum distance from the edge 180 on the frame assembly 26 to allow the holding block 116' to move to the right or towards the foot portion 76 of the frame assembly 26 to allow the force on the force sensing element in the strain gauge assembly 22 to be gradually released.

Various other modifications and embodiments are contemplated and intended to be covered within the scope of the appended claims.

I claim:

1. A calibration device for a banding tool which measures the force on a band developed by the banding tool comprising:
   means for measuring the force on the band secured relative thereto;
   band securing means for releasably securing a portion of the band to said measuring means; and
   force releasing means, mechanically coupled to said measuring means, said force releasing means defining a first position wherein said measuring means is rigidly secured relative to said securing means to allow said force to be applied to said measuring means and alternate positions selectable upon command for gradually releasing the force on said measuring means.

2. A calibration device as recited in claim 1, wherein said force measuring element forms a portion of a strain gauge assembly.

3. A calibration device as recited in claim 2, wherein said strain gauge assembly is a horseshoe type linear strain gauge assembly.

4. A calibration device as recited in claim 1, wherein said band securing means includes a releasable jaw assembly having a feed track.

5. A calibration device as recited in claim 4, wherein said releasable jaw assembly includes a gripper.

6. A calibration device as recited in claim 5, wherein said gripper is disposed adjacent said feed track.

7. A calibration device as recited in claim 5, wherein said gripper is formed with a sloped surface 8. A calibration device as recited claim 5, wherein said gripper is spring biased toward said feed track.

9. A calibration device as recited in claim 8, further including a lever operatively coupled to said gripper for displacing said gripper away from said feed track.

10. A calibration device as recited in claim 1, wherein said force releasing means includes a cam for allowing the force on the measuring means to be gradually released.

11. A calibration device as recited in claim 10, including means for carrying said measuring means, said band securing means and said force releasing means, wherein said releasing means includes a holding block rigidly secured to said measuring means and releasably secured relative to said carrying means.

12. A calibration device as recited in claim 11, wherein said holding block is formed as a generally rectangular member.

13. A calibration device as recited in claim 12, wherein said holding block is formed with an outwardly extending flange on one side for allowing movable mounting of said holding block relative to said carrying means.

14. A calibration device as recited in claim 13, wherein said holding block is formed with an outwardly extending cam follower on a side opposite said flange.

15. A calibration device as recited in claim 14, further including means for pivotally mounting said cam relative to said carrying means.

16. A calibration device as recited in claim 15, wherein said cam is operable between a normal position and a release position, wherein in said release position said holding block is adapted to move toward said band securing means.

17. A calibration device as recited in claim 16, further including a force release lever rigidly connected to said cam.

18. A calibration device as recited in claim 14 further including a force release lever defining a longitudinal centerline formed with said cam on one end and a pivot point offset from said longitudinal centerline of the force release lever, disposed at the same end as said cam.

19. A calibration device as recited in claim 18, wherein said force release lever is pivotally connected about said pivot point defining a first position wherein said holding block is in a normal position and a release position wherein said holding block is relatively closer to said band securing means than in said first position.

20. A calibration device as recited in claim 12, wherein said holding block is formed with a pair of oppositely disposed ears, adapted to be slidably mounted relative to said carrying means.

21. A calibration device as recited in claim 12, further including means for pivotally mounting said holding block relative to said carrying means.

22. A calibration device for measuring the force on a band developed by a banding tool comprising:
   means for measuring forces on a band secured thereto;
   means for releasably securing a portion of the band to said measuring means; and
   a removable nosepiece formed to receive the nosepiece of the banding tool under calibration.

23. A calibration device as recited in claim 22, further including a frame for carrying said measuring means and said securing means; wherein said nosepiece is removably secured to said frame.

24. A calibration device as recited in claim 23, wherein said nosepiece is formed with a notch to allow it to be secured to the frame.

25. A calibration device for measuring the force on a metal band developed by a banding tool comprising:
   means for measuring forces on a band secured thereto;
   means for releasably securing a portion of said band to said measuring means; wherein said securing means includes a removable nosepiece formed to receive a nosepiece of the banding tool under calibration; and
   means for gradually releasing the force on said force measuring element after the measurement.

* * * * *